(12) United States Patent
Matsutaka et al.

(10) Patent No.: US 12,291,154 B2
(45) Date of Patent: May 6, 2025

(54) COMMUNICATION DEVICE, COMMUNICATION SYSTEM, COMMUNICATION METHOD, AND COMPUTER READABLE MEDIUM

(71) Applicant: Mitsubishi Electric Corporation, Tokyo (JP)

(72) Inventors: Yasushi Matsutaka, Tokyo (JP); Takashi Asahara, Tokyo (JP); Toshinori Hori, Tokyo (JP); Koshiro Ishihara, Tokyo (JP); Yasunori Kato, Tokyo (JP); Shusaku Umeda, Tokyo (JP); Kenichi Nakura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 446 days.

(21) Appl. No.: 17/840,053

(22) Filed: Jun. 14, 2022

(65) Prior Publication Data

US 2022/0311132 A1 Sep. 29, 2022

Related U.S. Application Data

(63) Continuation of application No. PCT/JP2020/004810, filed on Feb. 7, 2020.

(51) Int. Cl.
*B60R 16/023* (2006.01)
*H04W 64/00* (2009.01)

(52) U.S. Cl.
CPC ......... *B60R 16/023* (2013.01); *H04W 64/006* (2013.01)

(58) Field of Classification Search
CPC .... B60R 16/023; B60R 25/24; H04W 64/006; E05B 49/00; G08G 1/09; G08G 1/16; H04M 11/00
See application file for complete search history.

(56) References Cited

U.S. PATENT DOCUMENTS

| 9,786,178 B1 | 10/2017 | Bai et al. |
| RE48,958 E | 3/2022 | Strickland et al. |

(Continued)

FOREIGN PATENT DOCUMENTS

| CN | 110312203 A | 10/2019 |
| JP | 2002-77972 A | 3/2002 |

(Continued)

OTHER PUBLICATIONS

International Search Report (PCT/ISA/210) issued in PCT/JP2020/004810, dated Apr. 21, 2020.

(Continued)

*Primary Examiner* — Liem H. Nguyen
(74) *Attorney, Agent, or Firm* — Birch, Stewart, Kolasch & Birch, LLP

(57) ABSTRACT

A communication device (201) receives internal electric waves (302) emitted toward inside a vehicle (100) by an internal communicator (102) mounted in the vehicle (100), and receives external electric waves (303) emitted toward outside the vehicle (100) by an external communicator (103) mounted in the vehicle (100). The communication device (201) determines whether the communication device (201) is inside the vehicle (100) or outside the vehicle (100), from a reception intensity of the received internal electric waves (302) and from a reception intensity of the received external electric waves (303).

7 Claims, 14 Drawing Sheets

(56) References Cited

U.S. PATENT DOCUMENTS

| | | | |
|---|---|---|---|
| 2002/0025823 A1* | 2/2002 | Hara | G07C 9/00309 |
| | | | 455/456.5 |
| 2007/0229219 A1* | 10/2007 | Nakashima | B60R 25/245 |
| | | | 340/5.72 |
| 2010/0231349 A1* | 9/2010 | Tanaka | B60R 25/24 |
| | | | 340/426.22 |
| 2013/0003680 A1 | 1/2013 | Yamamoto et al. | |
| 2015/0035685 A1 | 2/2015 | Strickland et al. | |
| 2015/0091740 A1 | 4/2015 | Bai et al. | |
| 2017/0372612 A1 | 12/2017 | Bai et al. | |
| 2018/0087295 A1* | 3/2018 | Lickfelt | B60C 5/005 |
| 2018/0096605 A1 | 4/2018 | Bai et al. | |
| 2018/0290622 A1* | 10/2018 | Mori | G08B 21/00 |
| 2018/0316445 A1* | 11/2018 | Hamada | H04W 64/00 |
| 2018/0330618 A1 | 11/2018 | Bai et al. | |
| 2019/0130682 A1* | 5/2019 | Farges | B60R 25/245 |
| 2019/0248331 A1* | 8/2019 | Salah | G01S 5/0284 |
| 2020/0037133 A1* | 1/2020 | Kusumoto | G01S 13/76 |
| 2020/0082653 A1* | 3/2020 | Hazebrouck | G01S 11/06 |
| 2020/0233072 A1* | 7/2020 | Osai | G07C 9/00309 |
| 2021/0006956 A1* | 1/2021 | Chen | G08G 1/163 |
| 2021/0155268 A1* | 5/2021 | Oba | B60W 60/0053 |
| 2021/0168563 A1* | 6/2021 | Sanji | E05B 49/00 |
| 2021/0231766 A1* | 7/2021 | Brueckner | B60R 25/32 |
| 2021/0345094 A1* | 11/2021 | Koga | H04W 4/021 |
| 2021/0356555 A1* | 11/2021 | Sanji | E05B 49/00 |

FOREIGN PATENT DOCUMENTS

| | | |
|---|---|---|
| JP | 2003-341804 A | 12/2003 |
| JP | 2004-19381 A | 1/2004 |
| JP | 2004-178495 A | 6/2004 |
| JP | 2004-219387 A | 8/2004 |
| JP | 2005-9933 A | 1/2005 |
| JP | 2005-232794 A | 9/2005 |
| JP | 2005-339521 A | 12/2005 |
| JP | 2005-352577 A | 12/2005 |
| JP | 2010-195229 A | 9/2010 |
| JP | 2011-172195 A | 9/2011 |
| JP | 2011-199739 A | 10/2011 |
| JP | 2012-10021 A | 1/2012 |
| JP | 2015-32312 A | 2/2015 |
| JP | 2015-151767 A | 8/2015 |
| JP | 2015-219641 A | 12/2015 |
| JP | 2017-224049 A | 12/2017 |
| JP | 2018-21385 A | 2/2018 |
| JP | 2018-206186 A | 12/2018 |
| JP | 2019-73960 A | 5/2019 |
| JP | 2019-156056 A | 9/2019 |
| WO | WO 2012/114568 A1 | 8/2012 |
| WO | WO 2019/077819 A1 | 4/2019 |
| WO | WO-2019171962 A1 * | 9/2019 |

OTHER PUBLICATIONS

Chinese Office Action and Search Report for Chinese Application No. 202080095098.7, dated May 31, 2024, with English translation of the Office Action.

Chinese Office Action for Chinese Application No. 202080095098.7, dated Jan. 15, 2025, with English translation.

* cited by examiner

Fig. 10

| DOOR IDENTIFIER | INSTALLED POSITION | FACING DIRECTION |
|---|---|---|
| ID-A | DRIVER'S SEAT | INSIDE |
| ID-B | FRONT PASSENGER SEAT | INSIDE |
| ID-C | REAR-SEAT LEFT | INSIDE |
| ID-D | REAR-SEAT RIGHT | INSIDE |
| ID-E | DRIVER'S SEAT | OUTSIDE |
| ID-F | FRONT PASSENGER SEAT | OUTSIDE |
| ID-G | REAR-SEAT LEFT | OUTSIDE |
| ID-H | REAR-SEAT RIGHT | OUTSIDE |

Fig. 11

| COMMUNICATOR IDENTIFIER | DOOR IDENTIFIER | INSIDE/OUTSIDE | OPEN-DOOR NUMBER | OPEN-DOOR IDENTIFIER | OPEN-DOOR IDENTIFIER | OPEN-DOOR IDENTIFIER |
|---|---|---|---|---|---|---|
| ID-A | DRIVER'S SEAT | INSIDE | 2 | DRIVER'S SEAT | FRONT PASSENGER SEAT | — |
| ... | | | | | | ... |

Fig. 12

| COMMUNICATOR IDENTIFIER | DOOR IDENTIFIER | INSIDE/ OUTSIDE | OPEN-DOOR NUMBER | OPEN-DOOR IDENTIFIER | OPEN-DOOR IDENTIFIER | OPEN-DOOR IDENTIFIER | ... |
|---|---|---|---|---|---|---|---|
| ID-A | DRIVER'S SEAT | INSIDE | 0 | - | - | - | ... |

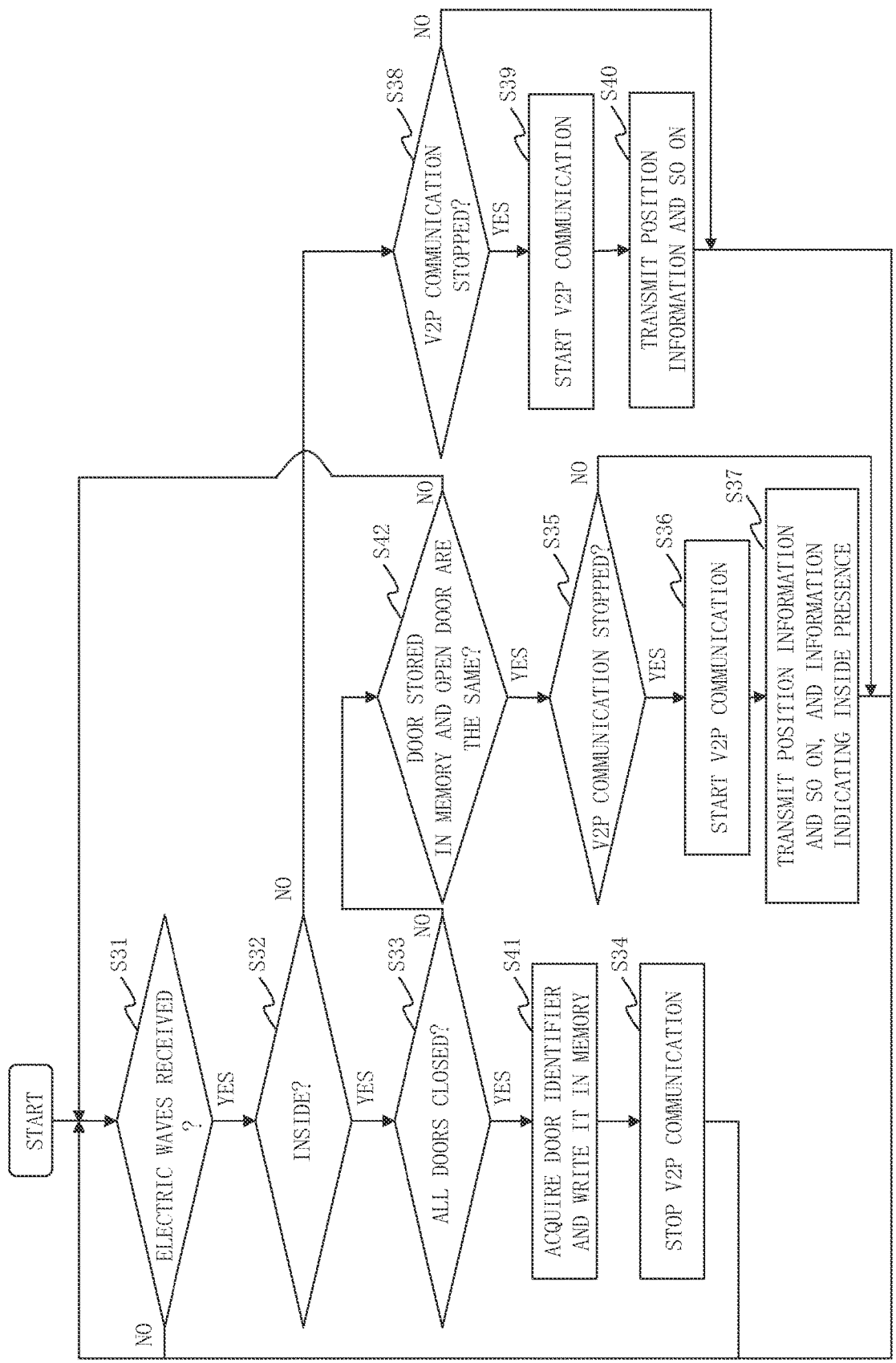

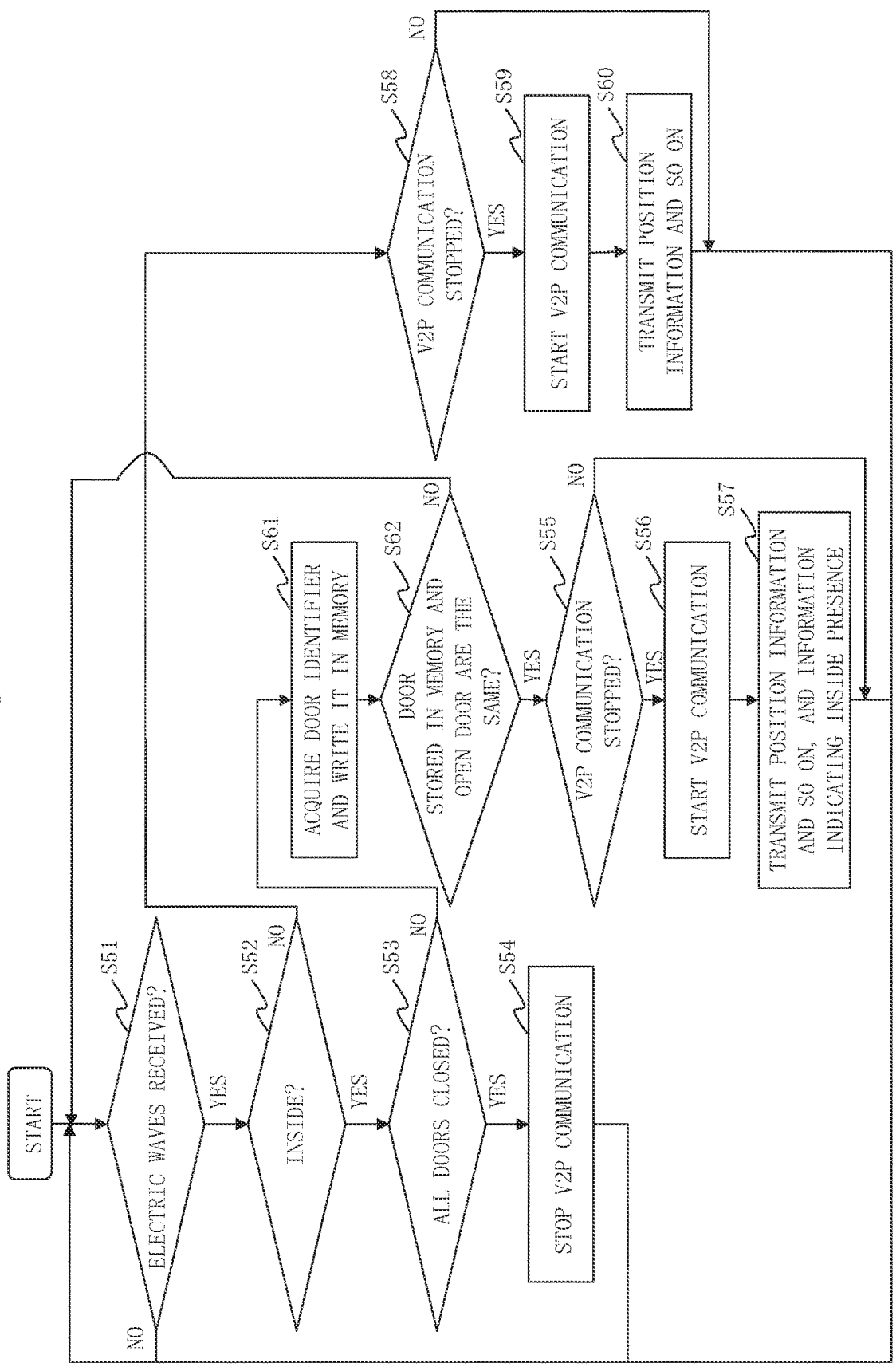

COMMUNICATION DEVICE, COMMUNICATION SYSTEM, COMMUNICATION METHOD, AND COMPUTER READABLE MEDIUM

CROSS REFERENCE TO RELATED APPLICATIONS

This application is a Continuation of PCT International Application PCT/JP2020/004810, filed on Feb. 7, 2020, which is hereby expressly incorporated by reference into the present application.

TECHNICAL FIELD

The present disclosure relates to communication between an in-vehicle device or the like mounted in a vehicle and a communication device held by a holder.

BACKGROUND ART

Development of Vehicle-to-everything (V2X) communication is underway to realize autonomous driving or driving assistance. V2X communication includes Vehicle-to-Pedestrian (V2P) communication which is communication between a communication device held by a pedestrian and an in-vehicle device.

In V2P communication, the in-vehicle device mounted in the vehicle and the communication device held by the pedestrian communicate position information with each other. The in-vehicle device performs autonomous driving or driving assistance of the vehicle on a basis of a position of a communication terminal which is indicated by the position information. The communication terminal issues a warning to the pedestrian as necessary on the basis of a vehicle position indicated by the position information. Traffic safety is thus realized.

One of purposes of V2P communication is to avoid danger by recognizing an existence of a pedestrian with using an in-vehicle device. However, when the holder of the communication device is on board the vehicle, if the communication device operates as a communication device in V2P communication, a situation where there is a person on the roadway is resulted. If there is a person on the roadway, the vehicle is forced to slow down or to stop, which may cause traffic congestion. Operating as a communication device in V2P communication will be described as operating as a P-side terminal hereinafter.

Therefore, when the communication device held by the holder exists in the vehicle, it is necessary to stop the operation of the communication device as the P-side terminal. Further, when this communication device is displaced to outside the vehicle, the communication device must restart the operation as the P-side terminal.

In Patent Literature 1, a communication device held by a driver of a vehicle is associated with an in-vehicle device of the vehicle in advance. Then, in Patent Literature 1, when the in-vehicle device detects that the vehicle has stopped and that a door is opened, the communication device associated with the in-vehicle device is instructed to switch from a driver mode to a pedestrian mode. Also, in Patent Literature 1, when the in-vehicle device detects that the driver of the vehicle approaches the vehicle and unlocks the door with using a keyless fob, the communication device associated with the in-vehicle device is instructed to switch from the pedestrian mode to the driver mode. In Patent Literature 1, switching can be performed between operating the communication device as the P-side terminal and not, according to switching between the pedestrian mode and the driver mode.

CITATION LIST

Patent Literature

Patent Literature 1: JP 2015-32312 A

SUMMARY OF INVENTION

Technical Problem

In Patent Literature 1, it is necessary to associate the vehicle and the communication device in advance. However, it is difficult to associate the communication device with a vehicle that is not used ordinarily, such as a bus, a taxi, and an acquaintance's vehicle.

An objective of the present disclosure is to make it possible to appropriately determine whether a communication device is inside a vehicle or outside the vehicle without associating the vehicle with the communication device in advance.

Solution to Problem

A communication device according to the present disclosure includes:

an electric wave reception unit to receive internal electric waves emitted to inside a vehicle by an internal communicator mounted in the vehicle, and to receive external electric waves emitted to outside the vehicle by an external communicator mounted in the vehicle; and an inside/outside determination unit to determine whether the communication device is inside the vehicle or outside the vehicle, from a reception intensity of the internal electric waves received by the electric wave reception unit and from a reception intensity of the external electric waves received by the electric wave reception unit.

Advantageous Effects of Invention

In the present disclosure, whether a communication device is inside a vehicle or outside the vehicle is determined from a reception intensity of internal electric waves and a reception intensity of external electric waves. This makes it possible to appropriately determine whether the communication device is inside the vehicle or outside the vehicle without associating the vehicle with the communication device in advance.

BRIEF DESCRIPTION OF DRAWINGS

FIG. 10 is an explanatory diagram of layout of internal communicators 102 and external communicators 103 according to Embodiment 3.

FIG. 11 is an explanatory diagram of internal electric waves 302 or external electric waves 303 in a case where doors are open.

FIG. 12 is an explanatory diagram of the internal electric waves 302 or the external electric waves 303 in a case where doors are closed.

FIG. 13 is a flowchart illustrating operations of a communication device 201 according to Embodiment 3.

FIG. 14 is a flowchart illustrating operations of a communication device 201 according to Modification 4.

DESCRIPTION OF EMBODIMENTS

Embodiment 1

*Description of Configurations*

Figure 1:
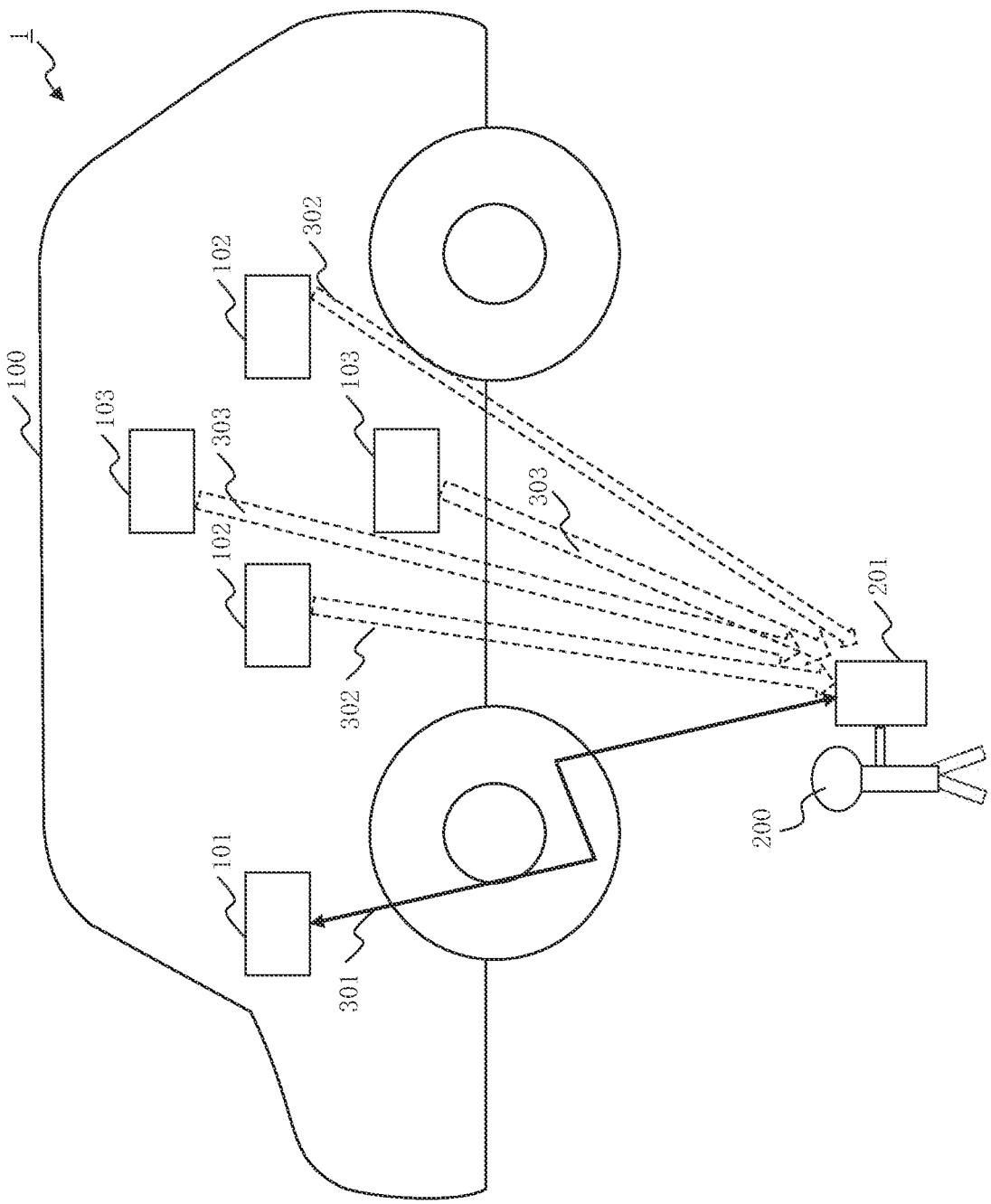
FIG. 1 is a configuration diagram of a communication system 1 according to Embodiment 1.

A configuration of a communication system 1 according to Embodiment 1 will be described with referring to FIG. 1.

The communication system 1 is provided with an in-vehicle device 101 mounted in a vehicle 100, and a communication device 201 held by a holder 200. One or more internal communicators 102 and one or more external communicators 103 are mounted in the vehicle 100.

The in-vehicle device 101 and the communication device 201 perform V2P communication via radio electric waves 301. The internal communicator 102 emits internal electric waves 302, being weak electric waves, toward inside of the vehicle 100. The external communicator 103 emits external electric waves 303, being weak electric waves, toward outside of the vehicle 100. The communication device 201 receives the internal electric waves 302 and the external electric waves 303.

In FIG. 1, the in-vehicle device 101 is mounted in the vehicle 100. However, the in-vehicle device 101 may be attachable to the vehicle or detachable from the vehicle.

A hardware configuration of the in-vehicle device 101 according to Embodiment 1 will be described with referring to FIG. 2.

The in-vehicle device 101 is a computer.

The in-vehicle device 101 is provided with hardware devices which are a processor 111, a memory 112, a storage 113, a display interface 114, an audio output interface 115, a sensor interface 116, a V2X communicator 117, and a clock circuit 118. The processor 111 is connected to the other hardware devices via a signal line and controls the other hardware devices.

Figure 3:
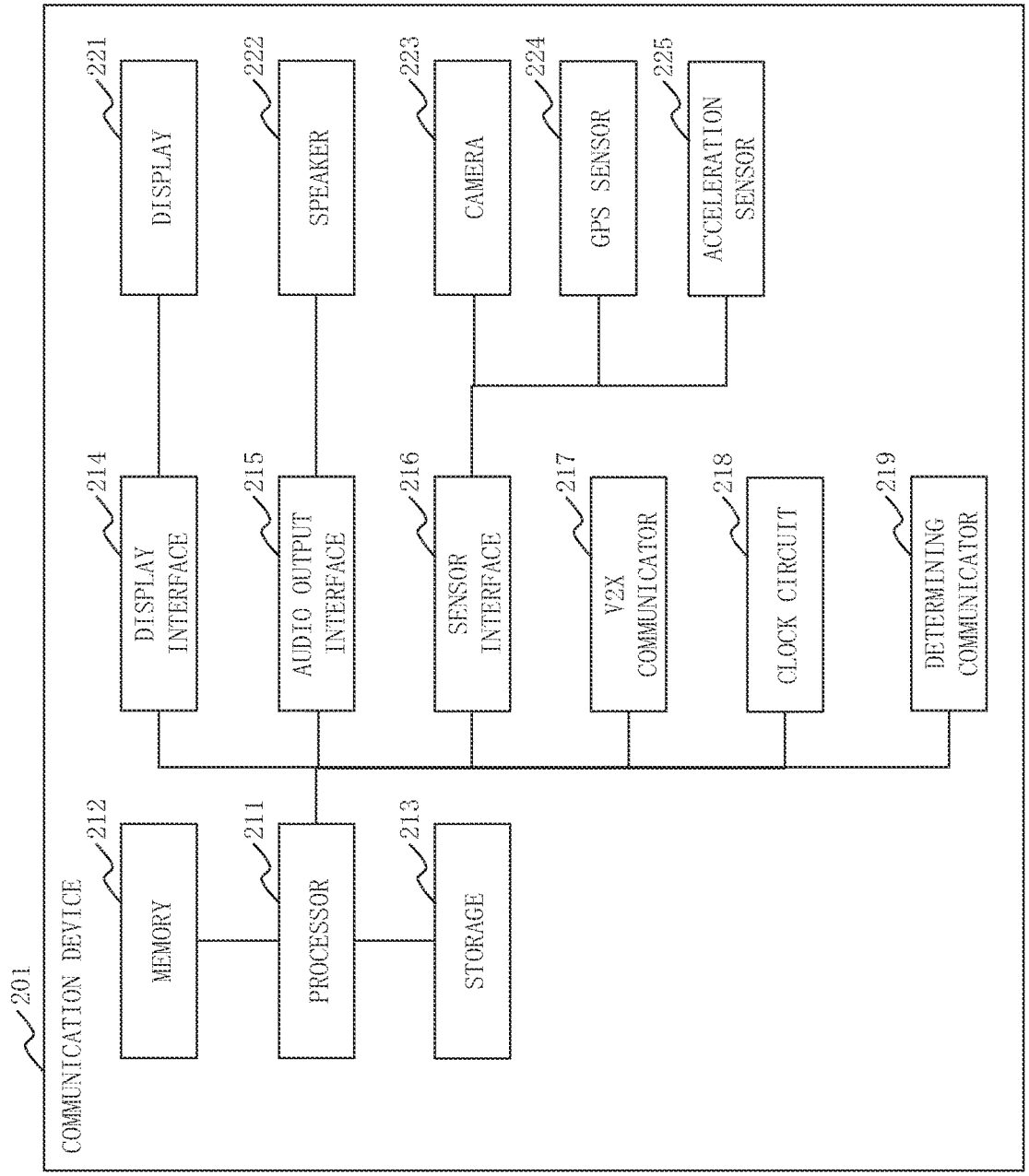
FIG. 3 is a hardware configuration diagram of a communication device 201 according to Embodiment 1.

A hardware configuration of the communication device 201 according to Embodiment 1 will be described with referring to FIG. 3.

The communication device 201 is a computer such as a smartphone.

The communication device 201 is provided with hardware devices which are a processor 211, a memory 212, a storage 213, a display interface 214, an audio output interface 215, a sensor interface 216, a V2X communicator 217, a clock circuit 218, and a determining communicator 219. The processor 211 is connected to the other hardware devices via a signal line and controls the other hardware devices.

The processors 111 and 211 are each an Integrated Circuit (IC) that performs processing. Specific examples of the processors 111 and 211 are a Central Processing Unit (CPU), a Digital Signal Processor (DSP), and a Graphics Processing Unit (GPU).

The memories 112 and 212 are each a storage device that stores data temporarily. Specific examples of the memories 112 and 212 are a Static Random-Access Memory (SRAM) and a Dynamic Random-Access Memory (DRAM).

The storages 113 and 213 are each a storage device that keeps data. Specific examples of the storages 113 and 213 are a Hard Disk Drive (HDD) and a Read-Only Memory (ROM). The storages 113 and 213 may be each a portable recording medium such as a Secure Digital (SD, registered trademark) memory card, a CompactFlash (registered trademark, CF), a NAND flash, a flexible disk, an optical disk, a compact disk, a Blu-ray (registered trademark) Disc, and a Digital Versatile Disk (DVD).

The display interfaces 114 and 215 are each an interface for connecting displays 121 and 221, respectively. A specific example of the display interfaces 114 and 215 is a High-Definition Multimedia Interface (HDMI, registered trademark) port.

When the displays 121 and 221 are touch panels, their operation contents may be communicated to the processors 111 and 211 via the display interfaces 114 and 215, respectively.

The audio output interfaces 115 and 215 are interfaces for connecting speakers 122 and 222, respectively. A specific example of the audio output interface 115 is a Universal Serial Bus (USB) port.

The sensor interfaces 116 and 216 are interfaces for connecting various types of sensors. A specific example of the sensor interfaces 116 and 216 is a USB port.

Sensors such as a camera 123, a Global Positioning System (GPS) sensor 124, a vehicle speed sensor 125, and a door open/close sensor 126 are mounted in the vehicle 100. These sensors are connected to the CPU 111 via the sensor interface 116. As mentioned above, the internal communicator 102 and the external communicator 103 are mounted in the vehicle 100. The internal communicator 102 and the external communicator 103 are connected to the CPU 111 via the sensor interface 116.

Sensors such as a camera 223, a GPS sensor 224, and an acceleration sensor 225 are mounted in the communication device 201. These sensors are connected to the CPU 211 via the sensor interface 216.

The cameras 123 and 223 are devices that acquire peripheral image data. The GPS sensors 124 and 224 are devices that receive a positioning signal transmitted from a GPS satellite. The vehicle speed sensor 125 is a device that measures a speed of the vehicle 100. The door open/close sensor 126 is a device provided to each door of the vehicle 100 to detect whether the door is open or closed. The acceleration sensor 225 is a device that measures an acceleration of the communication device 201.

The V2X communicators 117 and 217 are circuits that perform V2X communication. That is, the in-vehicle device 101 performs two-way communication with an in-vehicle device 101 mounted in a vehicle other than the vehicle 100 and with the communication device 201, by using the V2X communicator 117 via the radio electric waves 301. Likewise, the communication device 201 performs two-way communication with the in-vehicle device 101 and with a communication device 201 held by another holder, by using the V2X communicator 217 via the radio electric waves 301.

Note that "X" of the V2X communicator 117 may include another communication target depending on a mode of implementation of the in-vehicle device 101 and vehicle 100 and depending on communication setting employed, and is not limited to the communication target mentioned above.

The clock circuits 118 and 218 are circuits that measure date and time. The date and time measured by the clock circuit 118 may be synchronized with the date and time measured by the clock circuit 218 regularly on the basis of the positioning signals received by the GPS sensors 124 and 224, and the like.

The determining communicator 219 is a circuit that receives the internal electric waves 302 emitted by the internal communicator 102 and the external electric waves 303 emitted by the external communicator 103.

The in-vehicle device 101 and the communication device 201 may be provided with other hardware devices in addition to the illustrated hardware devices. For example, the in-vehicle device 101 and the communication device 201 may be provided with microphones so as to respectively notify the processors 111 and 211 of audio operation contents.

Figure 2:
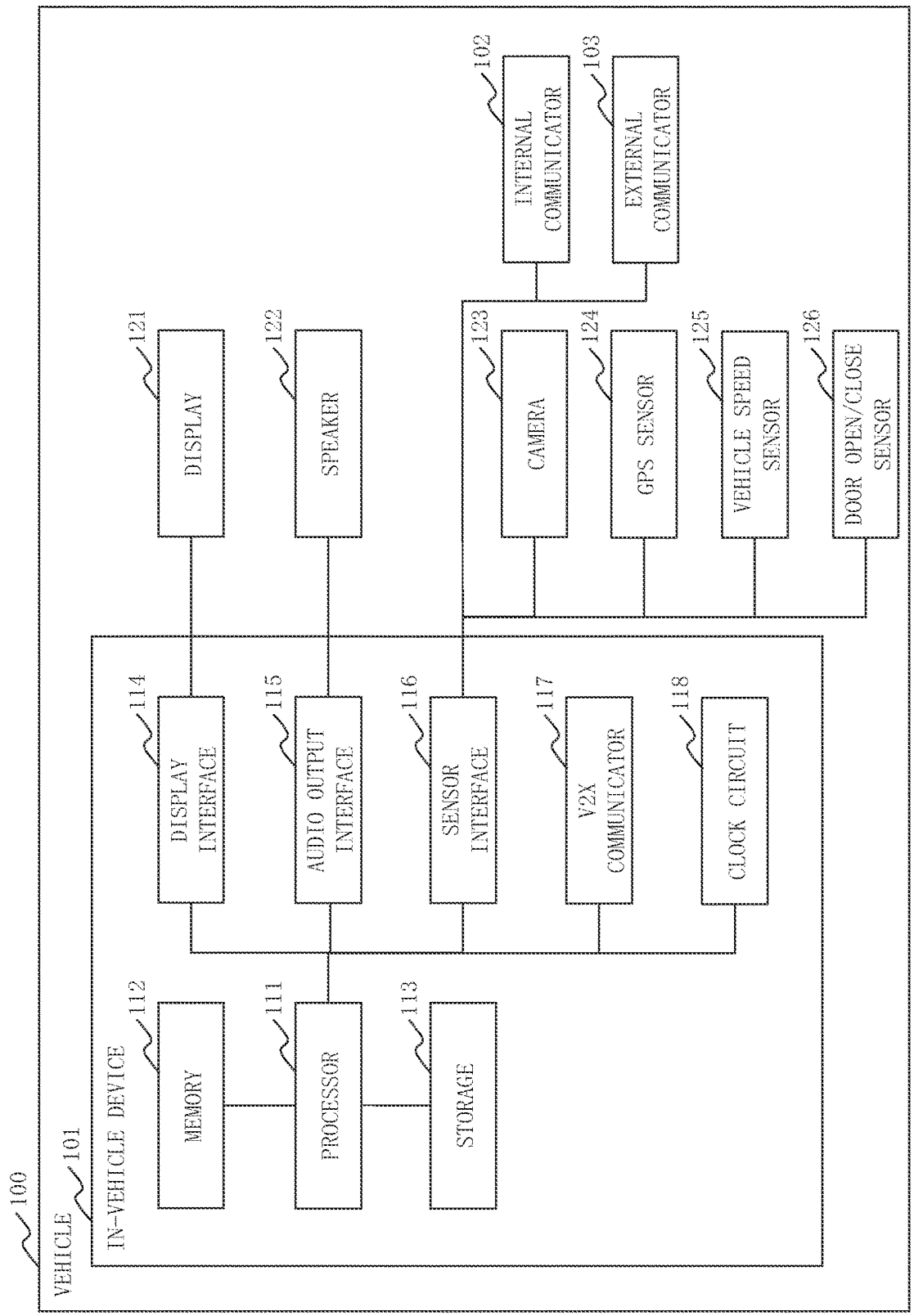
FIG. 2 is a hardware configuration diagram of an in-vehicle device 101 according to Embodiment 1.

In FIG. 2, the various types of sensors, the internal communicator 102, and the external communicator 103 are provided outside the in-vehicle device 101. However, the various types of sensors, the internal communicator 102, and the external communicator 103 may be provided inside the in-vehicle device 101 partly or entirely.

Figure 4:
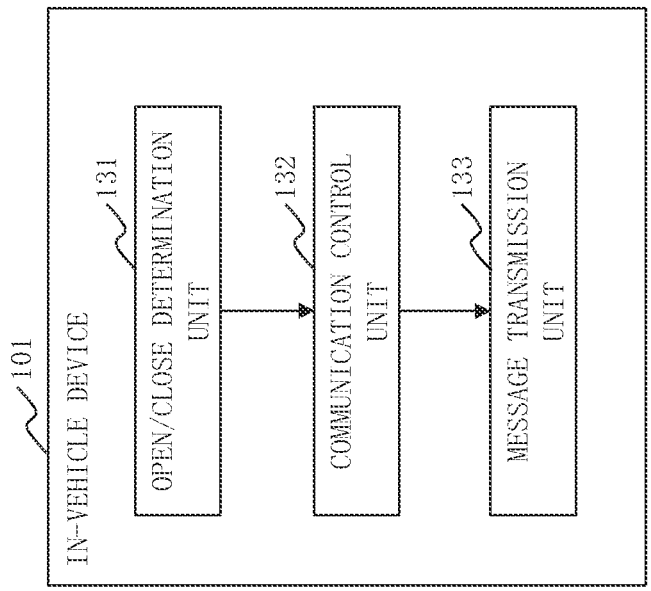
FIG. 4 is a function configuration diagram of the in-vehicle device 101 according to Embodiment 1.

A functional configuration of the in-vehicle device 101 according to Embodiment 1 will be described with referring to FIG. 4.

The in-vehicle device 101 is provided with an open/close determination unit 131, a communication control unit 132, and a message transmission unit 133, as function constituent elements. Functions of the function constituent elements of the in-vehicle device 101 are implemented by software.

A program that implements the functions of the function constituent elements of the in-vehicle device 101 is stored in the storage 113. This program is read into the memory 112 by the processor 11 and is run by the processor 111. The functions of the function constituent elements of the in-vehicle device 101 are thus implemented.

Map data is also stored in the storage 113. The map data is road information like one used by a car navigation system. The map data is used for autonomous driving or driving assistance.

Figure 5:
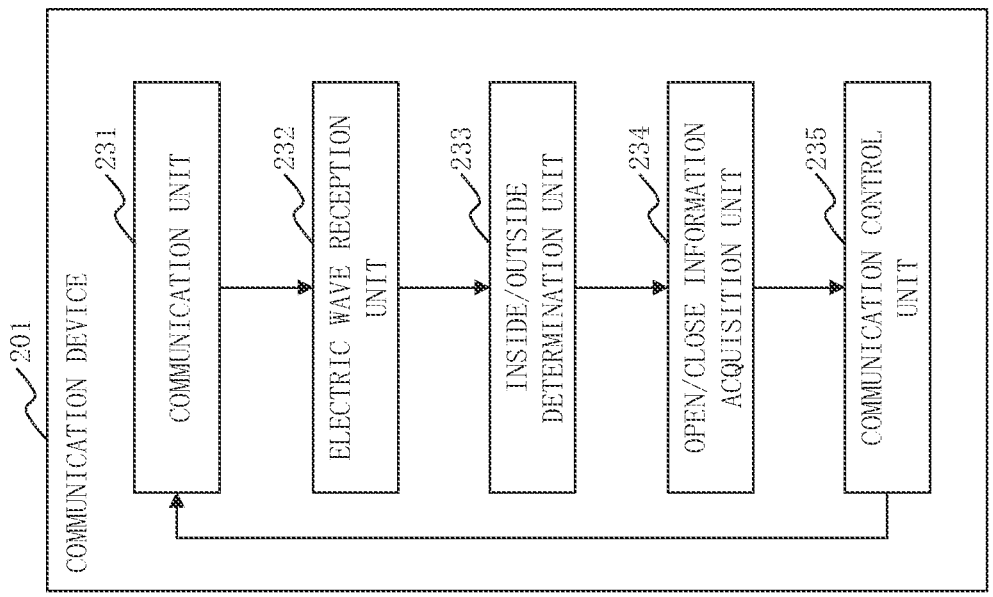
FIG. 5 is a function configuration diagram of the communication device 201 according to Embodiment 1.

A functional configuration of the communication device 201 according to Embodiment 1 will be described with referring to FIG. 5.

The communication device 201 is provided with a communication unit 231, an electric wave reception unit 232, an inside/outside determination unit 233, an open/close information acquisition unit 234, and a communication control unit 235, as function constituent elements. Functions of the function constituent elements of the communication device 201 are implemented by software.

A program that implements the functions of the function constituent elements of the communication device 201 is stored in the storage 213. This program is read into the memory 212 by the processor 211 and is run by the processor 211. The functions of the function constituent elements of the communication device 201 are thus implemented.

*Description of Operations*

Operations of the communication system 1 according to Embodiment 1 will be described with referring to FIGS. 6 to 8.

An operation procedure of the communication system 1 according to Embodiment 1 corresponds to a communication method according to Embodiment 1. A program that implements the operations of the communication system 1 according to Embodiment 1 corresponds to a communication program according to Embodiment 1.

Operations of the in-vehicle device 101 according to Embodiment 1 will be described with referring to FIG. 6.

Figure 6:
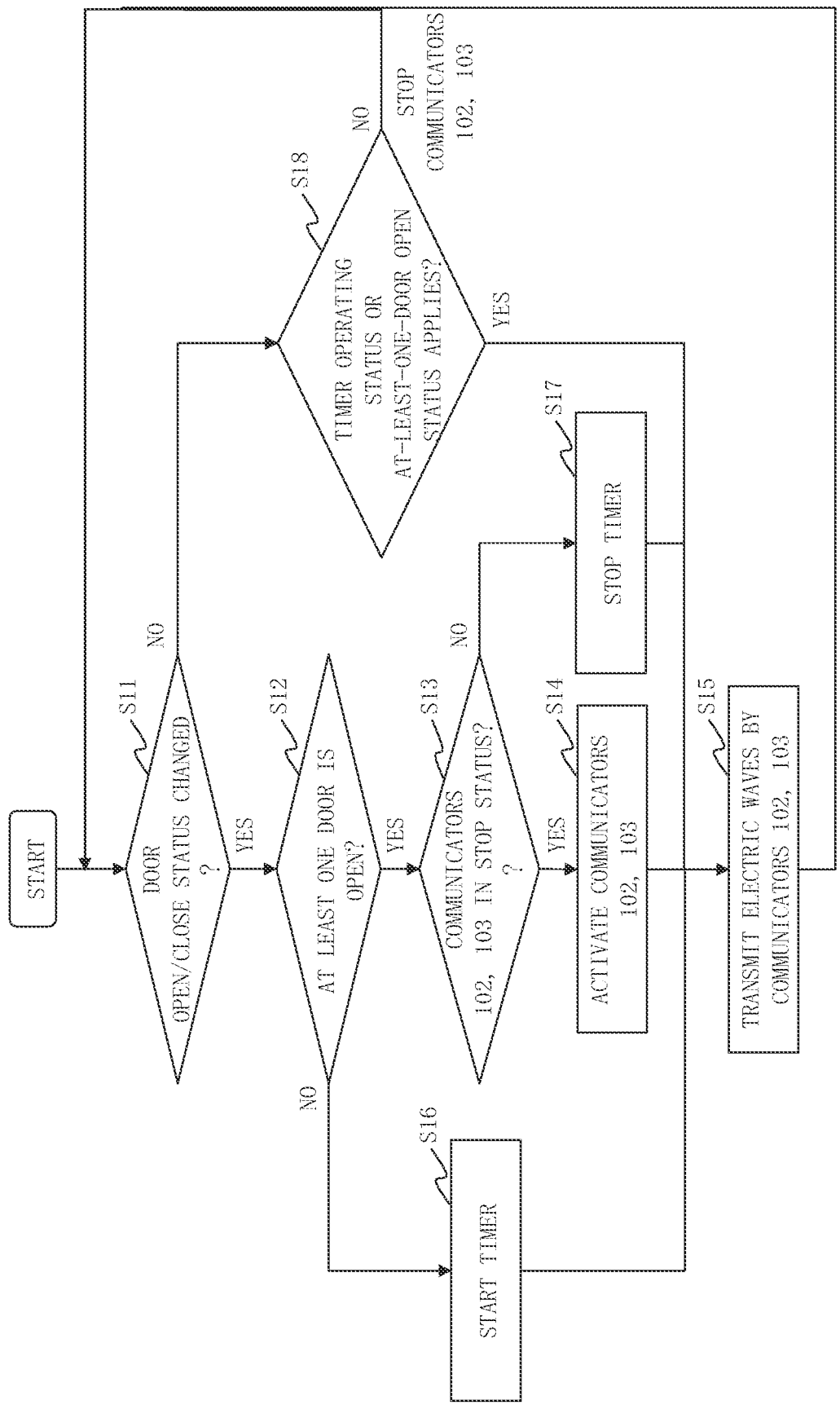
FIG. 6 is a flowchart illustrating operations of the in-vehicle device 101 according to Embodiment 1.

The in-vehicle device 101 executes processes illustrated in FIG. 6 so as to notify the communication device 201 of information necessary for determining whether the communication device 201 operates as a P-side terminal or not.

(Step S11: Door Status Detection Process)

The open/close determination unit 131 determines whether an open/close status of a door of the vehicle 100 has changed or not.

Specifically, the open/close determination unit 131 monitors data outputted from the door open/close sensor 126 which is connected via the sensor interface 116. If the data outputted from the door open/close sensor 126 has changed, the open/close determination unit 131 determines that the door open/close status has changed.

If the door open/close status has changed, the open/close determination unit 131 advances the processing to step S12. On the other hand, if the door open/close status has not changed, the open/close determination unit 131 advances the processing to step S18.

(Step S12: Open/Close Determination Process)

The open/close determination unit 131 determines whether at least one of a plurality of doors of the vehicle 100 is in an open status or not.

Specifically, the open/close determination unit 131 determines whether the data outputted from the door open/close sensor 126 connected via the sensor interface 116 indicates that at least one door is in an open status or not.

If at least one door is in an open status, the open/close determination unit 131 advances the processing to step S13. On the other hand, if all doors are in a closed status, the open/close determination unit 131 advances the processing to step S16.

(Step S13: Stop Determination Process)

The communication control unit 132 determines whether the internal communicator 102 and external communicator 103 are in a stop status or not.

In a specific example, the communication control unit 132 transmits an operation check signal to the internal communicator 102 and external communicator 103 and acquires responses. The communication control unit 132 determines whether the internal communicator 102 and external communicator 103 are in a stop status or in an operating status in accordance with whether a response is acquired or not.

If the internal communicator 102 and external communicator 103 are in a stop status, the communication control unit 132 advances the processing to step S14. On the other hand, if the internal communicator 102 and external communicator 103 are in an operating status, the communication control unit 132 advances the processing to step S17.

(Step S14: Activation Process)

The communication control unit 132 activates the internal communicator 102 and the external communicator 103.

In a specific example, the communication control unit 132 transmits an activation signal to the internal communicator 102 and the external communicator 103 to activate the internal communicator 102 and the external communicator 103.

(Step S15: Message Transmission Process)

The message transmission unit 133 transmits electric waves by using the internal communicator 102 and the external communicator 103.

Specifically, the message transmission unit 133 emits the internal electric waves 302 toward inside the vehicle 100 by using the internal communicator 102. Regarding this, the message transmission unit 133 emits the internal electric waves 302 to include identification information as the internal electric waves 302 and open/close information indicating an open/close status of each door of the vehicle 100. The message transmission unit 133 also emits the external electric waves 303 toward outside the vehicle 100 by using the external communicator 103. Regarding this, the message transmission unit 133 emits the external electric waves 303 to include identification information as the external electric waves 303 and open/close information indicating an open/close status of each door of the vehicle 100.

(Step S16: Timer Start Process)

The communication control unit 132 sets a stop time and starts a timer for stopping the internal communicator 102 and external communicator 103. When the timer reaches the stop time, the internal communicator 102 and the external communicator 103 stop.

(Step S17: Timer Stop Process)

The communication control unit 132 stops the timer. 100361 (Step S18: Transmission Determination Process) The communication control unit 132 determines whether at least either a timer operating status or an at-least-one-door open status applies.

If at least either one status applies, the communication control unit 132 advances the processing to step S15, and causes the message transmission unit 133 to transmit a message. On the other hand, if neither status applies, the communication control unit 132 stops the internal communicator 102 and the external communicator 103, and returns the processing to step S11.

Operations of the communication device 201 according to Embodiment 1 will be described with referring to FIG. 7.

Figure 7:
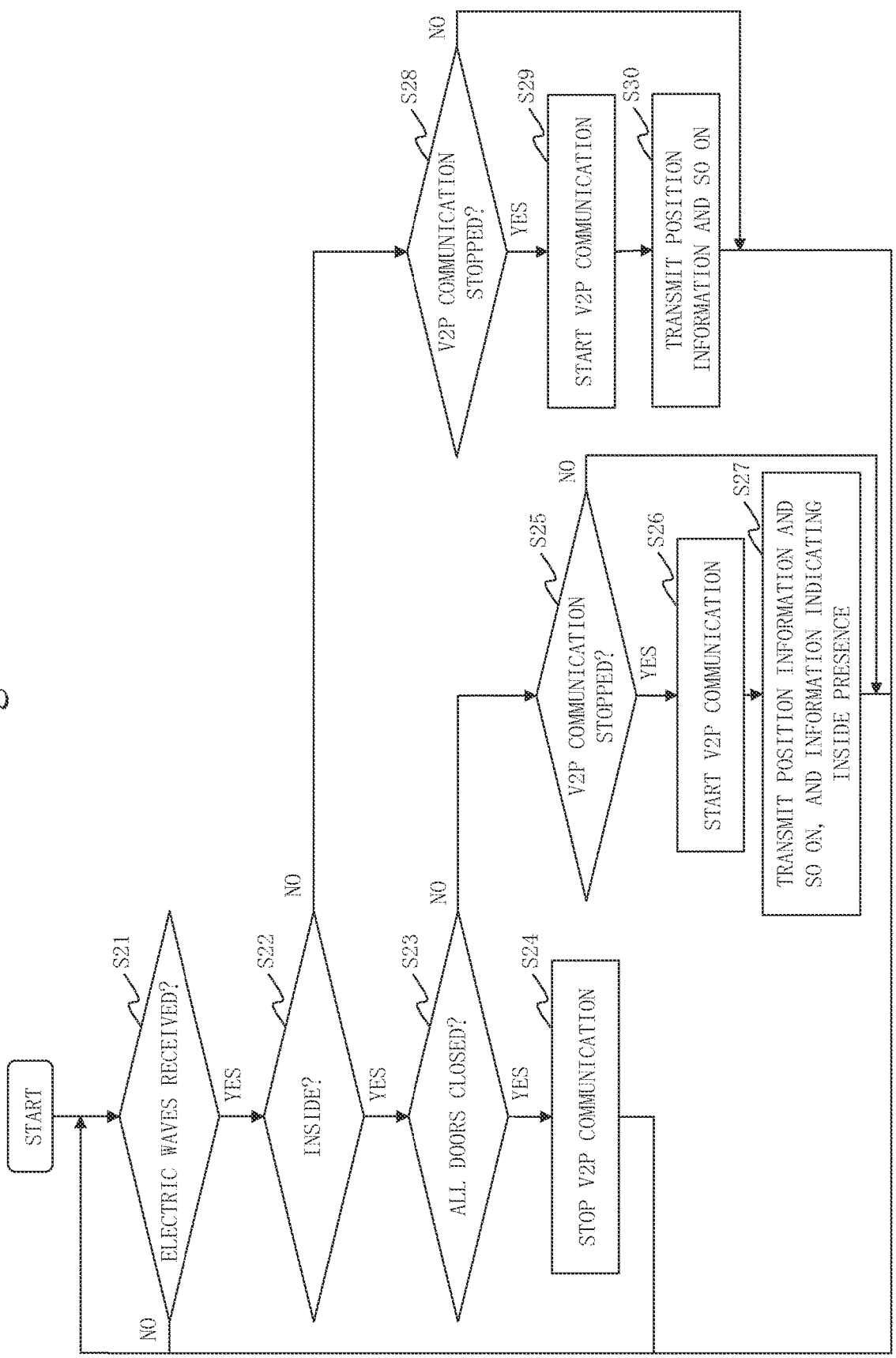
FIG. 7 is a flowchart illustrating operations of the communication device 201 according to Embodiment 1.
Figure 8:
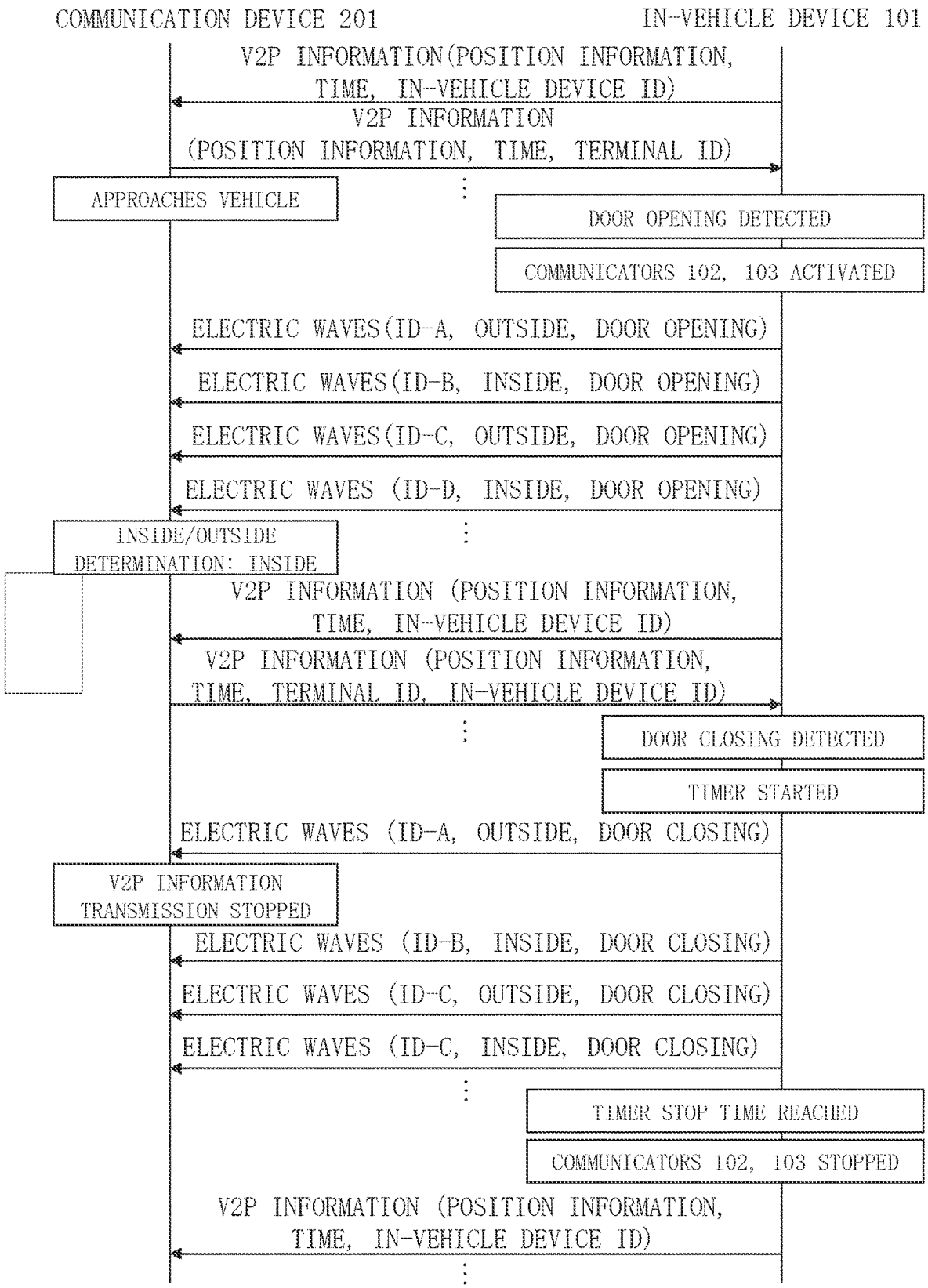
FIG. 8 is a process flow diagram illustrating a flow of processing of a case where the communication device 201 according to Embodiment 1 is displaced from outside to inside a vehicle 100.

The communication device 201 executes processes illustrated in FIG. 7 to determine whether the communication device 201 is inside the vehicle 100 or outside the vehicle 100. Then, the communication device 201 determines whether to operate as the P-side terminal or not, in accordance with whether the communication device 201 is inside the vehicle 100 or outside the vehicle 100.

In the processes of FIG. 7, if V2P communication is not stopped, the communication unit 231 transmits information periodically toward a device on a periphery via V2P communication. The information to be transmitted changes depending on the situation, as will be described later. Still, the information to be transmitted includes at least position information, an acquisition time of the position information, and a terminal ID which is an identifier of the communication device 201. The position information is information indicating a position of the communication device 201 and identified from the positioning signal acquired by the GPS sensor 224. If position information has been acquired by another application installed in the communication device 201, the position information acquired by this another application may be utilized. How to acquire the position information is not limited to the acquisition method described above.

(Step S21: Electric Wave Reception Process)

The electric wave reception unit 232 determines whether at least either the internal electric waves 302 emitted by the internal communicator 102 or the external electric waves 303 emitted by the external communicator 103 are received or not.

Specifically, the electric wave reception unit 232 monitors the internal electric waves 302 emitted by the internal communicator 102 and the external electric waves 303 emitted by the external communicator 103. When the internal electric waves 302 or the external electric waves 303 are emitted, the electric wave reception unit 232 receives them.

If electric signals are received, the electric wave reception unit 232 advances the processing to step S22. On the other hand, if electric waves are not received, the electric wave reception unit 232 returns the processing to step S21.

(Step S22: Inside/Outside Determination Process)

The inside/outside determination unit 233 determines whether the communication device 201 is inside the vehicle 100 or outside the vehicle 100, from the reception intensity of the internal electric waves 302 received in step S21 and from the reception intensity of the external electric waves 303 received in step S21.

If the communication device 201 is inside the vehicle 100, the inside/outside determination unit 233 advances the processing to step S23. On the other hand, if the communication device 201 is outside the vehicle 100, the inside/outside determination unit 233 advances the processing to step S28.

Specifically, the inside/outside determination unit 233 determines whether the communication device 201 is inside the vehicle 100 or outside the vehicle 100 in accordance with which reception intensity is higher between the reception intensity of the internal electric waves and the reception intensity of the external electric waves. That is, if the reception intensity of the internal electric waves 302 is higher than the reception intensity of the external electric waves 303, the inside/outside determination unit 233 determines that the communication device 201 is inside the vehicle 100. On the other hand, if the reception intensity of the external electric waves 303 is higher than the reception intensity of the internal electric waves 302, the inside/outside determination unit 233 determines that the communication device 201 is outside the vehicle 100.

When a plurality of internal communicators 102 and a plurality of external communicators 103 are mounted in the vehicle 100, the inside/outside determination unit 233 determines whether the communication device 201 is inside the vehicle 100 or outside the vehicle 100 in accordance with whether the electric waves with the highest reception strength are the internal electric waves 302 or the external electric waves 303. That is, if the electric waves with the highest reception intensity are the internal electric waves 302, the inside/outside determination unit 233 determines that the communication device 201 is inside the vehicle 100. On the other hand, if the electric waves with the highest reception intensity are the external electric waves 303, the inside/outside determination unit 233 determines that the communication device 201 is outside the vehicle 100.

When the plurality of internal communicators 102 and the plurality of external communicators 103 are mounted in the vehicle 100, the inside/outside determination unit 233 may determine whether the communication device 201 is inside the vehicle 100 or outside the vehicle 100 by majority decision on the basis of three types of the electric waves with high reception intensities. That is, if two or more types of the electric waves among the three types of the electric waves with high reception intensities are the internal electric waves 302, the inside/outside determination unit 233 determines that the communication device 201 is inside the vehicle 100. On the other hand, if two or more types of the electric waves among the three types of the electric waves with high reception intensities are the external electric waves 303, the inside/outside determination unit 233 determines that the communication device 201 is outside the vehicle 100.

The inside/outside determination unit 233 may determine whether the communication device 201 is inside the vehicle 100 or outside the vehicle 100 by employing any method other than the method described above, as far as the employed method is based on the reception intensity of the internal electric waves 302 and the reception intensity of the external electric waves 303.

(Step S23: Open/Close Determination Process)

The open/close information acquisition unit 234 acquires open/close information included in the internal electric waves 302 received in step S21 or in the external electric waves 303 received in step S21.

If the open/close information indicates that all doors are closed, the open/close information acquisition unit 234 advances the processing to step S24. On the other hand, if the open/close information indicates that at least one door is open, the open/close information acquisition unit 234 advances the processing to step S25.

(Step S24: Communication Stop Process)

The communication control unit 235 stops information transmission of the communication unit 231 using V2P communication.

That is, if the communication device 201 is determined to be inside the vehicle 100 and if the open/close information indicates that all doors are closed, the communication control unit 235 stops information transmission of the communication unit 231 using V2P communication. To stop information transmission of the communication unit 231 using V2P communication signifies that the communication device 201 stops operations as the P-side terminal.

(Step S25: Stop Determination Process)

The communication control unit 235 determines whether information transmission of the communication unit 231 using V2P communication has been stopped or not.

If information transmission of the communication unit 231 using V2P communication has been stopped, the communication control unit 235 advances the processing to step S26. On the other hand, if information transmission of the communication unit 231 using V2P communication has not been stopped, the communication control unit 235 returns the processing to step S21.

(Step S26: Communication Start Process)

The communication control unit 235 starts information transmission by the communication unit 231 using V2P communication.

That is, if the communication device 201 is determined to be inside the vehicle 100, if the open/close information indicates that at least one door is open, and if information transmission of the communication unit 231 using V2P communication has been stopped, the communication control unit 235 starts information transmission of the communication unit 231 using V2P communication.

(Step S27: Inside-Vehicle Notification Process)

The communication unit 231 transmits information indicating that the communication device 201 is inside the vehicle 10, in addition to the position information, the acquisition time, and the terminal ID, toward a device on a periphery via V2P communication.

That is, if the communication device 201 is determined to be inside the vehicle 100 and if the open/close information indicates that at least one door is open, the communication unit 231 transmits information indicating that the communication device 201 is inside the vehicle 100, in addition to the position information, the acquisition time, and the terminal ID. For example, the communication unit 231 transmits an in-vehicle device ID, being an identifier of the in-vehicle device 101, as the information indicating that the communication device 201 is inside the vehicle 100. Regarding this, the communication unit 231 may transmit information indicating a possibility of getting off the vehicle 100.

(Step S28: Stop Determination Process)

The communication control unit 235 determines whether information transmission of the communication unit 231 using V2P communication has been stopped or not.

If information transmission of the communication unit 231 using V2P communication has been stopped, the communication control unit 235 advances the processing to step S29. On the other hand, if information transmission of the communication unit 231 using V2P communication has not been stopped, the communication control unit 235 returns the processing to step S21.

(Step S29: Communication Start Process)

The communication control unit 235 starts information transmission of the communication unit 231 using V2P communication.

That is, if the communication device 201 is determined to be outside the vehicle 100 and if information transmission of the communication unit 231 using V2P communication has been stopped, the communication control unit 235 starts information transmission of the communication unit 231 using V2P communication.

(Step S30: Position Notification Process)

The communication unit 231 transmits the position information, the acquisition time, and the terminal ID toward the device on the periphery via V2P communication.

That is, if the communication device 201 is determined to be outside the vehicle 100, the communication unit 231 transmits the position information, the acquisition time, and the terminal ID.

A flow of processing of a case where the communication device 201 according to Embodiment 1 has displaced from outside the vehicle 100 to inside the vehicle 100 will be described with referring to FIG. 8.

Since the communication device 201 is outside the vehicle 100, V2P communication is carried out between the in-vehicle device 101 and the communication device 201, for example, on a periodical basis. That is, the in-vehicle device 101 transmits position information indicating a position of the in-vehicle device 101, an acquisition time of the position information, and the in-vehicle device ID to the communication device 201. The communication device 201 transmits position information indicating a position of the communication device 201, an acquisition time of the position information, and a terminal ID to the in-vehicle device 101.

In the in-vehicle device 101, the open/close determination unit 131 detects that a door of the vehicle 100 is opened (step S11 through step S12 of FIG. 6). Then, the communication control unit 132 activates the internal communicator 102 and the external communicator 103 (step S13 through step S14 of FIG. 6). Subsequently, the message transmission unit 133 transmits electric waves by using the internal communicator 102 and the external communicator 103 (step S15 of FIG. 6).

The holder 200 who holds the communication device 201 approaches the vehicle 100. Hence, in the communication device 201, the electric wave reception unit 232 receives the internal electric waves 302 emitted by the internal communicator 102 and the external electric waves 303 emitted by the external communicator 103 (step S21 of FIG. 7). In FIG. 8, the two, ID-B and ID-D internal communicators 102 and the two, ID-A and ID-C external communicators 103 are mounted in the vehicle 100.

Regarding this, when the reception intensity of the internal electric waves 302 becomes higher than the reception intensity of the external electric waves 303, the inside/outside determination unit 233 determines that the communication device 201 is inside the vehicle 100 (step S22 of FIG. 7). Namely, displacement of the communication device 201 to inside the vehicle 100 is recognized.

When the door is in an open status, in the communication device 201, the communication unit 231 transmits information indicating that the communication device 201 is inside the vehicle 100, in addition to the position information, the acquisition time, and the terminal ID, to the in-vehicle device 101 (step S23 and step S25 through step S27 of FIG. 7). In FIG. 8, an in-vehicle device ID is transmitted as information indicating that the communication device 201 is inside the vehicle 100. Meanwhile, in the in-vehicle device 101, the message transmission unit 133 transmits the position information, the acquisition time, and the in-vehicle device ID to the communication device 201.

When the door is closed, in the in-vehicle device 101, the communication control unit 132 starts the timer (step S11 through step S12 and step S16 of FIG. 6). The message transmission unit 133 transmits the electric waves with using the internal communicator 102 and the external communicator 103 until the timer reaches the stop time. Meanwhile, in the communication device 201, the communication control unit 235 stops information transmission of the communication unit 231 using V2P communication (step S23 through step S24 of FIG. 7).

After that, the timer reaches the stop time. Then, in the in-vehicle device 101, the internal communicator 102 and the external communicator 103 are stopped and do not transmit electric waves anymore.

*Effect of Embodiment 1*

As described above, in the communication system 1 according to Embodiment 1, whether the communication device 201 is inside the vehicle 100 or outside the vehicle 100 is determined from the reception intensity of the internal electric waves 302 and the reception intensity of the external electric waves 303. Thus, whether the communication device 201 is inside the vehicle 100 or outside the vehicle 100 can be determined quickly and appropriately without associating the vehicle 100 and the communication device 201 to each other in advance.

As a result, switching can be performed quickly and appropriately between operating the communication device 201 as the P-side terminal, and not.

Further, in the communication system 1 according to Embodiment 1, if the communication device 201 is determined to be inside the vehicle 10 and if the open/close information indicates that at least one door is open, information indicating that the communication device 201 is inside the vehicle 100 is transmitted. The communication device 201 may transmit information indicating a possibility of getting off the vehicle 100. Hence, a vehicle on the periphery of the vehicle 100 can recognize the possibility that the holder who holds the communication device 201 might get off the vehicle 100.

As a result, the vehicle on the periphery can perform autonomous driving or driving assistance after recognizing the possibility that the holder 200 might get off the vehicle 100. For example, when driving on a periphery of the vehicle 100, the vehicle on the periphery can take an action such as dropping the speed and keeping a distance of a certain degree from the vehicle 100. This improves the safety of the vehicle on the periphery and the safety of the holder 200 of the communication device 201.

In the communication system 1 according to Embodiment 1, switching can be performed quickly and appropriately between operating the communication device 201 as the P-side terminal, and not. That is, on/off switching of V2P communication is performed quickly and appropriately. Therefore, unnecessary V2P communication is reduced, and wasteful consumption of a battery of the communication device 201 is reduced. As a result, the life of the battery of the communication device 201 can be extended.

Also, the in-vehicle device 101 does not receive information anymore, via V2P communication, from the communication device 201 that should not operate as the P-side terminal. Accordingly, a pedestrian who should not exist on the road will not be recognized anymore as existing on the road. As a result, processing of autonomous driving or driving assistance by the in-vehicle device 101 becomes efficient. Then, smooth operation of autonomous driving or driving assistance by the in-vehicle device 101 becomes possible.

*Other Configurations*

<Modification 1>

In Embodiment 1, the open/close determination unit 131 determines whether the door is in an open status or not.

The open/close determination unit 131 may determine whether the vehicle 100 is standing or not, in addition to whether the door is in an open status or not. The fact that the vehicle 100 has been stopped can be determined from the speed of the vehicle 100 which is obtained by the vehicle speed sensor 125. If the door is in an open status and if the vehicle 100 is in a standing status, the message transmission unit 133 may transmit electric waves by using the internal communicator 102 and the external communicator 103.

<Modification 2>

In Embodiment 1, the function constituent elements are implemented by software. Modification 2 may be possible in which the function constituent elements are implemented by hardware. Modification 2 will be described regarding its difference from Embodiment 1.

When the function constituent elements are implemented by hardware, an in-vehicle device 101 is provided with an electronic circuit in place of the processor 111, the memory 112, and the storage 113. The electronic circuit is a dedicated circuit that implements the functions of the function constituent elements of the in-vehicle device 101 and functions of the memory 112 and storage 113. That is, it is possible to paraphrase the in-vehicle device 101 as a control circuit.

Likewise, when the function constituent elements are implemented by hardware, a communication device 201 is provided with an electronic circuit in place of the processor 211, the memory 212, and the storage 213. The electronic circuit is a dedicated circuit that implements the functions of the function constituent elements of the communication device 201 and functions of the memory 212 and storage 213.

The electronic circuit may be a single circuit, a composite circuit, a programmed processor, a parallel-programmed processor, a logic IC, a Gate Array (GA), an Application Specific Integrated Circuit (ASIC), or a Field-Programmable Gate Array (FPGA).

The function constituent elements may be implemented by one electronic circuit, or by a plurality of electronic circuits through decentralization.

<Modification 3>

Modification 3 may be possible in which some of the function constituent elements are implemented by hardware and the remaining function constituent elements are implemented by software.

The processor 11, the memory 12, the storage 13, and the electronic circuit are referred to as processing circuitry. That is, the functions of the function constituent elements are implemented by processing circuitry.

Embodiment 2

In Embodiment 2, a flow of processing of a case where a communication device 201 has displaced from inside a vehicle 100 to outside the vehicle 100 will be described. In Embodiment 2, a difference from Embodiment 1 will be described, and the same respect will not be described.

*Description of Operations*

Figure 9:
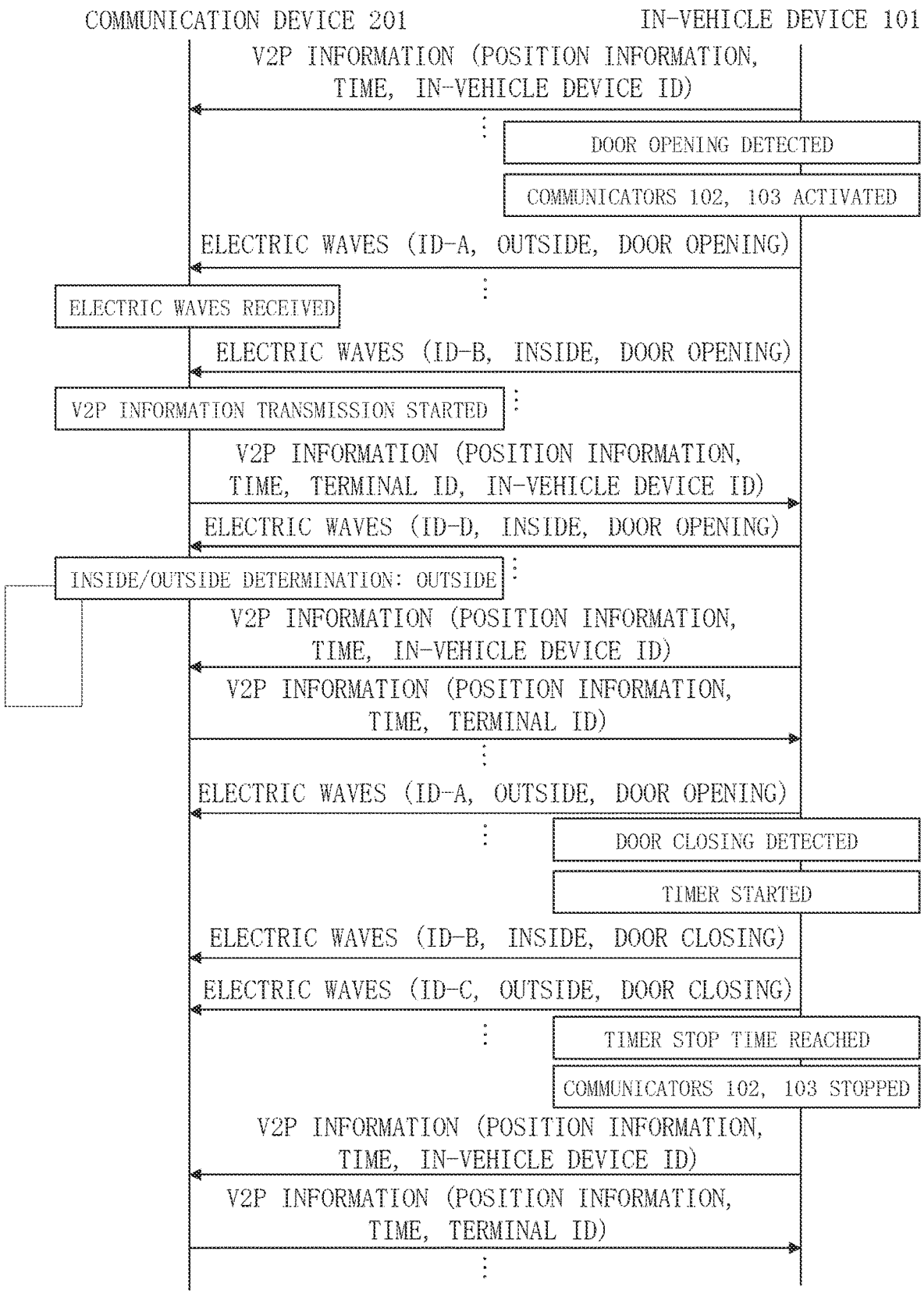
FIG. 9 is a process flow diagram illustrating a flow of processing of a case where a communication device 201 according to Embodiment 2 is displaced from inside to outside the vehicle 100.

A flow of processing of a case where the communication device 201 according to Embodiment 2 has displaced from inside the vehicle 100 to outside the vehicle 100 will be described with referring to FIG. 9.

Since the communication device 201 is inside the vehicle 100, the communication device 201 stops V2P communication. Meanwhile, an in-vehicle device 101 performs V2P communication. Therefore, the in-vehicle device 101 transmits position information indicating a position of the in-vehicle device 101, an acquisition time of the position information, and an in-vehicle device ID to the communication device 201 periodically.

In the in-vehicle device 101, an open/close determination unit 131 detects that a door of the vehicle 100 is opened (step S11 through step S12 of FIG. 6). Then, the communication control unit 132 activates an internal communicator 102 and an external communicator 103 (step S13 through step S14 of FIG. 6). Subsequently, a message transmission unit 133 transmits electric waves by using the internal communicator 102 and the external communicator 103 (step S15 of FIG. 6).

A holder 200 who holds the communication device 201 is inside the vehicle 100. Hence, in the communication device 201, an electric wave reception unit 232 receives internal electric waves 302 emitted by the internal communicator 102 and external electric waves 303 emitted by the external communicator 103 (step S21 of FIG. 7). Since the holder 200 is inside the vehicle 100, at the time the electric wave reception unit 232 receives the internal electric waves 302 and the external electric waves 303, it is determined that the communication device 201 is inside the vehicle 100 (step S22 of FIG. 7). The door is in an open status (step S23 of FIG. 7). Hence, in the communication device 201, a communication control unit 235 resumes information transmission of a communication unit 231 by using V2P communication (step S25 through step S26 of FIG. 7). Then, the communication unit 231 transmits information indicating that the communication device 201 is inside the vehicle 100, in addition to the position information, the acquisition information, and the terminal ID, to the in-vehicle device 101 (step S27 of FIG. 7).

When information transmission of the communication unit 231 using V2P communication is resumed, acquisition of the position information using a GPS sensor 224 is resumed. If position information is acquired by another application installed in the communication device 201, the position information acquired by another application may be used.

After that, at the time the reception intensity of the external electric waves 303 becomes higher than the reception intensity of the internal electric waves 302, an inside/outside determination unit 233 determines that the communication device 201 is outside the vehicle 100 (step S22 of FIG. 7). That is, it is recognized that the communication device 201 has displaced to outside the vehicle 100. When it is recognized that the communication device 201 has displaced to outside the vehicle 100, the communication unit 231 transmits only the position information, the acquisition time, and the terminal ID, not including information indicating that the communication device 201 is inside the vehicle 100, to the in-vehicle device 101 (step S28 through step S30 of FIG. 7).

Then, when the door is closed, in the in-vehicle device 101, a communication control unit 132 starts the timer (step S11 through step S12 and step S16 of FIG. 6). The message transmission unit 133 transmits the electric waves with using the internal communicator 102 and the external communicator 103 until the timer reaches the stop time. After that, the timer reaches the stop time. Then, in the in-vehicle device 101, the internal communicator 102 and the external communicator 103 are stopped and do not transmit electric waves anymore.

*Effect of Embodiment 2*

As described above, in the communication system 1 according to Embodiment 2, the communication device 201 starts V2P communication before getting out of the vehicle 100. Then, the communication device 201 transmits information indicating that the communication device 201 is inside the vehicle 100. Hence, a vehicle on the periphery of the vehicle 100 can recognize the possibility that the holder 200 who holds the communication device 201 might get off the vehicle 100.

This consequently improves the safety of the holder who holds the communication device 201 when the holder is getting off the vehicle 100.

Embodiment 3

In Embodiment 3, internal communicators 102 are provided to correspond to a plurality of doors of a vehicle 100, so that whether a holder 200 who holds a communication device 201 is getting off the vehicle 100 or not can be determined appropriately. In this respect. Embodiment 3 is different from Embodiments 1 and 2. In Embodiment 3, this difference will be described, and the same respect will not be described.

*Description of Operations*

Layout of the internal communicators 102 and external communicators 103 according to Embodiment 3 will be described with referring to FIG. 10.

In Embodiment 3, the internal communicators 102 are provided to correspond to the plurality of doors of the vehicle 100. Regarding this, not only the internal communicators 102 but also the external communicators 103 are provided to correspond to the plurality of doors of the vehicle 100.

In FIG. 10, it is assumed the vehicle 100 is provided with doors at four positions, namely, the drivers seat, the front passenger seat, the rear-seat left, and the rear-seat right. In FIG. 10, the four, ID-A to ID-D internal communicators 102 and the four, ID-E to ID-H external communicators 103 are mounted in the vehicle 100. The ID-A internal communicator 102 and the ID-E external communicator 103 correspond to the door for the driver's seat. The ID-B internal communicator 102 and the ID-F external communicator 103 correspond to the door for the front passenger seat. The ID-C internal communicator 102 and the ID-G external communicator 103 correspond to the door for the rear-seat left. The ID-D internal communicator 102 and the ID-H external communicator 103 correspond to the door for the rear-seat right.

Information to be included in internal electric waves 302 and transmitted by the internal communicator 102 and information to be included in external electric waves 303 and transmitted by the external communicator 103 will be described with referring to FIGS. 11 and 12.

The internal electric waves 302 and the external electric waves 303 include identifiers of the internal communicators 102 or the external communicators 103, identifiers of doors corresponding to the internal communicator 102 or the external communicator 103, information indicating whether the electric waves are the internal electric waves 302 or the external electric waves 303, a number of open doors, and identifiers of the open doors.

When doors are open, the number of open doors is entered as an open-door number, as illustrated in FIG. 11. Then, door identifiers are entered to correspond in number to the open doors. In FIG. 11, the driver's seat and the front passenger seat are entered as the identifiers of open doors.

When the doors are closed, 0 is entered as the open-door number, as illustrated in FIG. 12. When the doors are closed, that is, when the number of open doors is 0, identifiers of open doors are not entered and blank fields are left. In the present example, a field for a door that is not "open" is blank. Alternatively, only a field for a door that is "open" may be filled.

When a door is opened, the internal communicator 102 emits the internal electric waves 302 including information as illustrated in FIG. 11 according to the open door. Likewise, when a door is opened, the external communicator 103 emits the external electric waves 303 including information as illustrated in FIG. 11 according to the open door.

After that, when all doors are closed, the internal communicators 102 emit the internal electric waves 302 including information as illustrated in FIG. 12 until the timer stop time is reached. Likewise, when all doors are closed, the external communicators 103 emit the external electric waves 303 including information as illustrated in FIG. 12 until the timer stop time is reached.

Operations of the communication device 201 according to Embodiment 3 will be described with referring to FIG. 13.

Processes of step S31 through step S40 are the same as the processes of step S21 through step S30 of FIG. 7.
(Step S41: Door Storing Process))

If the communication device 201 is determined to be inside the vehicle 100 and if the open/close information indicates that all doors are closed, a communication control unit 235 acquires, from information included in the internal electric waves 302 having the highest reception power, an identifier of a corresponding door. That is, the communication control unit 235 acquires an identifier of a door corresponding to an emission-source internal communicator 102 of the internal electric waves 302 having the highest reception power. Then, the communication control unit 235 writes the acquired door identifier to a memory 212.
(Step S42: Door Determination Process)

The communication control unit 235 determines whether the door identifier written in the memory 212 in step S41 coincides with the identifier of an open door or not.

Specifically, the communication control unit 235 acquires an identifier of the open door which is included in the internal electric waves 302 or the external electric waves 303. The communication control unit 235 determines whether the door identifier written in the memory 212 is included in the identifier of the open door. If included, the communication control unit 235 determines that the door identifier written in the memory 212 coincides with the identifier of the open door.

If the door identifier written in the memory 212 coincides with the identifier of the open door, the communication control unit 235 advances the processing to step S35. On the other hand, if the door identifier written in the memory 212 does not coincide with the identifier of the open door, the communication control unit 235 returns the processing to step S31.

That is, if a door used by the holder 200 when getting on board the vehicle 100 is opened, the communication device 201 judges that the holder 200 is likely to get off the vehicle 100, and resumes V2P communication. On the other hand, if a door different from the door used by the holder 200 when getting on board the vehicle 100 is opened, the communication device 201 judges that the holder 200 will not get off the vehicle 100, and does not resume V2P communication.
*Effect of Embodiment 3*

As described above, in the communication system 1 according to Embodiment 3, the internal communicators 102 are provided to correspond to the plurality of doors of the vehicle 100, so that whether the holder 200 who holds the communication device 201 is to get off the vehicle 100 or not is determined appropriately.

As a result, switching can be performed appropriately between operating the communication device 201 as the P-side terminal, and not. Also, wasteful consumption of a battery of the communication device 201 is reduced.
*Other Configurations*
<Modification 4>

In Embodiment 3, when a door used by the holder 200 when getting on board the vehicle 100 is opened, it is judged that the holder 200 is likely to get off the vehicle 100. However, there may be a case where the holder 200 has displaced within the vehicle and a door used when getting on board the vehicle and a door to be used when getting off the vehicle are different.

In view of this, the operations of the internal communicator 102 may be modified as follows.

Operations of a communication device 201 according to Modification 4 will be described with referring to FIG. 14.

Processes of step S51 through step S60 are the same as the processes of step S21 through step S30 of FIG. 7.
(Step S61: Door Identification Process)

A communication control unit 235 acquires, from information included in internal electric waves 302 having the highest reception power among internal electric waves 302 received from internal communicators 102, an identifier of a corresponding door. That is, if the communication device 201 is determined to be inside a vehicle 100 and if at least one door is determined to be open, the communication control unit 235 acquires an identifier of a door corresponding to an emission-source internal communicator 102 of the internal electric waves 302 having the highest reception power.
(Step S62: Door Determination Process)

The communication control unit 235 determines whether the door identifier acquired in step S61 coincides with the identifier of an open door or not.

Specifically, the communication control unit 235 acquires an identifier of the open door which is included in the internal electric waves 302 or the external electric waves 303. The communication control unit 235 determines whether the door identifier acquired in step S61 is included in the identifier of the open door. If included, the communication control unit 235 determines that the door identifier acquired in step S61 coincides with the identifier of the open door.

If the door identifier acquired in step S61 coincides with the identifier of the open door, the communication control unit 235 advances the processing to step S55. On the other hand, if the door identifier acquired in step S61 does not coincide with the identifier of the open door, the communication control unit 235 returns the processing to step S51.

There may be a case where the holder 200 is sitting on a roadway side of the rear seat, and after a sidewalk-side door of the rear seat is opened, moves to a sidewalk side of the rear seat and gets off the vehicle through the sidewalk-side door. In this case, the processes illustrated in FIG. 14 are repeated. Hence, when the holder 200 approaches the sidewalk-side door of the rear seat, it is judged that the holder 200 is likely to get off the vehicle 100, and V2P communication is resumed.

Embodiments and modifications of the present disclosure have been described so far. Of these embodiments and modifications, several ones may be practiced by combination. Also, one or several ones of the embodiments and modifications may be practiced partly. Note that the present disclosure is not limited to the above embodiments and modifications, and various changes can be made to the present disclosure as necessary.

REFERENCE SIGNS LIST

1: communication system; 100: vehicle; 101: in-vehicle device; 102: internal communicator; 103: external communicator; 111: processor; 112: memory; 113: storage; 114: display interface; 115: audio output interface; 116: sensor interface; 117: V2X communicator; 118: clock circuit; 121: display; 122: speaker; 123: camera; 124: GPS sensor; 125: vehicle speed sensor; 126: door open/close sensor; 131: open/close determination unit; 132: communication control unit; 133: message transmission unit; 200: holder; 201: communication device; 211: processor; 212: memory; 213: storage; 214: display interface; 215: audio output interface; 216: sensor interface; 217: V2X communicator; 218: clock circuit; 219: determining communicator; 221: display; 222: speaker; 223: camera; 224: GPS sensor; 225: acceleration sensor; 231: communication unit; 232: electric wave reception unit; 233: inside/outside determination unit; 234: open/close information acquisition unit; 235: communication control unit; 301: radio electric waves; 302: internal electric waves; 303: external electric waves.

The invention claimed is:

1. A communication device comprising:
    processing circuitry
    to receive internal electric waves emitted toward inside a vehicle by an internal communicator mounted in the vehicle, and to receive external electric waves emitted toward outside the vehicle by an external communicator mounted in the vehicle, and
    to determine whether a position of the communication device is inside the vehicle or outside the vehicle, from a reception intensity of the received internal electric waves and from a reception intensity of the received external electric waves,
    wherein the processing circuitry
    transmits information periodically toward a device on a periphery,
    stops transmission of the information when the position of the communication device is determined to be inside the vehicle, and
    acquires open/close information indicating whether a door of the vehicle is open or closed,
    wherein when the position of the communication device is determined to be inside the vehicle and when the acquired open/close information indicates that the door is closed, the processing circuitry executes control to stop transmission of the information.

2. The communication device according to claim 1,
    wherein when the position of the communication device is determined to be inside the vehicle and when the open/close information indicates that the door is open, the processing circuitry transmits information indicating that the position of the communication device is inside the vehicle.

3. The communication device according to claim 2,
    wherein when the position of the communication device is determined to be inside the vehicle and when the open/close information indicates that the door is open, the processing circuitry transmits information indicating a possibility of getting off the vehicle.

4. The communication device according to claim 3,
    wherein the internal communicator is provided to correspond to a plurality of doors of the vehicle,
    wherein the open/close information indicates whether each of the plurality of doors of the vehicle is open or closed,
    wherein the processing circuitry determines which door the communication device is near to among the plurality of doors, from a reception intensity of the internal electric waves received from the internal communicator provided to correspond to the plurality of doors, and
    wherein when the position of the communication device is determined to be inside the vehicle and when the open/close information indicates that a door determined to be near is open, the processing circuitry transmits information indicating a possibility of getting off the vehicle.

5. A communication system comprising an in-vehicle device which can be mounted in a vehicle and a communication device which is held by a holder,
    wherein the in-vehicle device comprises:
    processing circuitry
    to emit internal electric waves toward inside the vehicle by an internal communicator mounted in the vehicle and to emit external electric waves toward outside the vehicle by an external communicator mounted in the vehicle, when a door of the vehicle is opened, and
    wherein the communication device comprises:
    processing circuitry
    to receive the internal electric waves emitted by the processing circuitry of the in-vehicle device and the external electric waves emitted by the processing circuitry of the in-vehicle device, and
    to determine whether a position of the communication device is inside the vehicle or outside the vehicle, from a reception intensity of the received internal electric waves and from a reception intensity of the received external electric waves,
    wherein the processing circuitry of the communication device
    transmits information periodically toward a device on a periphery,
    stops transmission of the information when the position of the communication device is determined to be inside the vehicle, and
    acquires open/close information indicating whether a door of the vehicle is open or closed, and wherein when the position of the communication device is determined to be inside the vehicle and when the acquired open/close information indicates that the door is closed, the processing circuitry of the communication device executes control to stop transmission of the information.

6. A communication method comprising:

by processing circuitry provided to a communication device, receiving internal electric waves emitted toward inside a vehicle by an internal communicator mounted in the vehicle, and receiving external electric waves emitted toward outside the vehicle by an external communicator mounted in the vehicle, and by the processing circuitry provided to the communication device, determining whether a position of the electric wave reception unit is inside the vehicle or outside the vehicle, from a reception intensity of the internal electric waves and from a reception intensity of the external electric waves, by the processing circuitry, transmitting information periodically toward a device on a periphery, by the processing circuitry, stopping transmission of the information when the position of the communication device is determined to be inside the vehicle, by the processing circuitry, acquiring open/close information indicating whether a door of the vehicle is open or closed, and when the position of the communication device is determined to be inside the vehicle and when the acquired open/close information indicates that the door is closed, executing control, by the processing circuitry of the communication device, to stop transmission of the information.

7. A non-transitory computer-readable medium recorded with a communication program which causes a computer to function as a communication device that performs:

an electric wave reception process of receiving internal electric waves emitted toward inside a vehicle by an internal communicator mounted in the vehicle, and receiving external electric waves emitted toward outside the vehicle by an external communicator mounted in the vehicle, with an electric wave reception unit provided to the communication device; and an inside/outside determination process of determining whether a position of the electric wave reception unit is inside the vehicle or outside the vehicle, from a reception intensity of the internal electric waves received by the electric wave reception process and from a reception intensity of the external electric waves received by the electric wave reception process;

a transmission process that transmits information periodically toward a device on a periphery, a stop transmission process that stops transmission of the information when the position of the communication device is determined to be inside the vehicle, and an open/close information acquisition process that acquires open/close information indicating whether a door of the vehicle is open or closed, wherein when the position of the communication device is determined to be inside the vehicle and when the acquired open/close information indicates that the door is closed, the communication device is controlled to stop transmission of the information.

* * * * *